E. C. BLISS.
SHAFT RELEASING AND BRAKE APPLYING DEVICE FOR VEHICLES.
APPLICATION FILED MAR. 23, 1915.
1,156,661.
Patented Oct. 12, 1915.
2 SHEETS—SHEET 2.
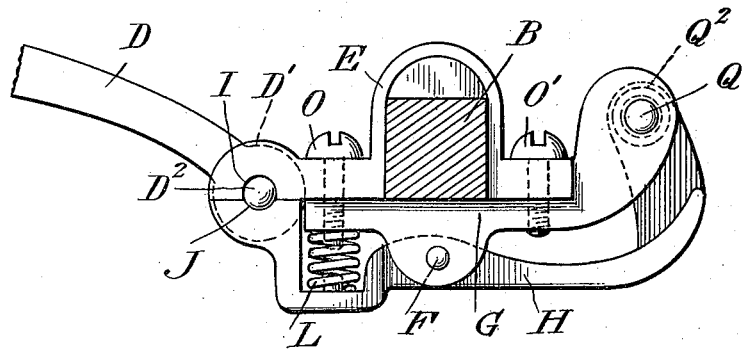
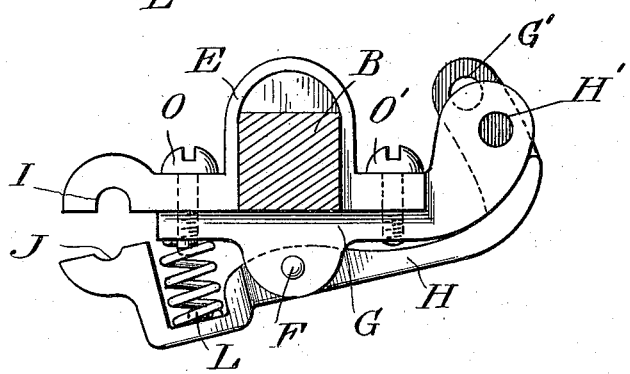
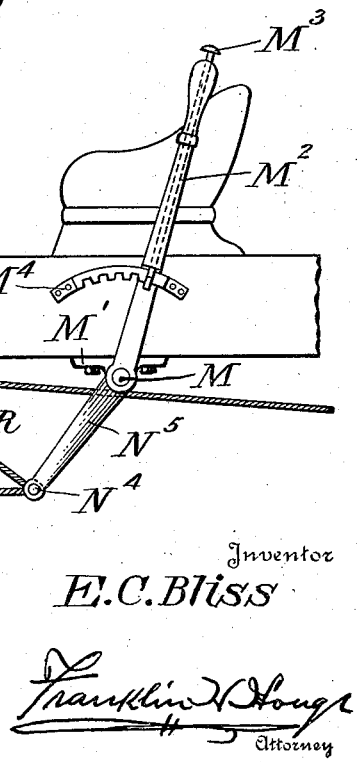
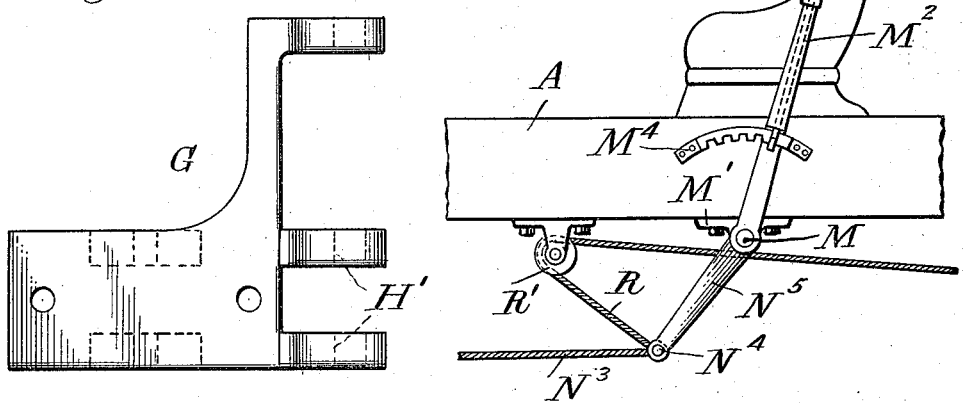
Witnesses
Fenton W Belt
J. W. Sherwood
Inventor
E. C. Bliss
By
Franklin W Hough
Attorney

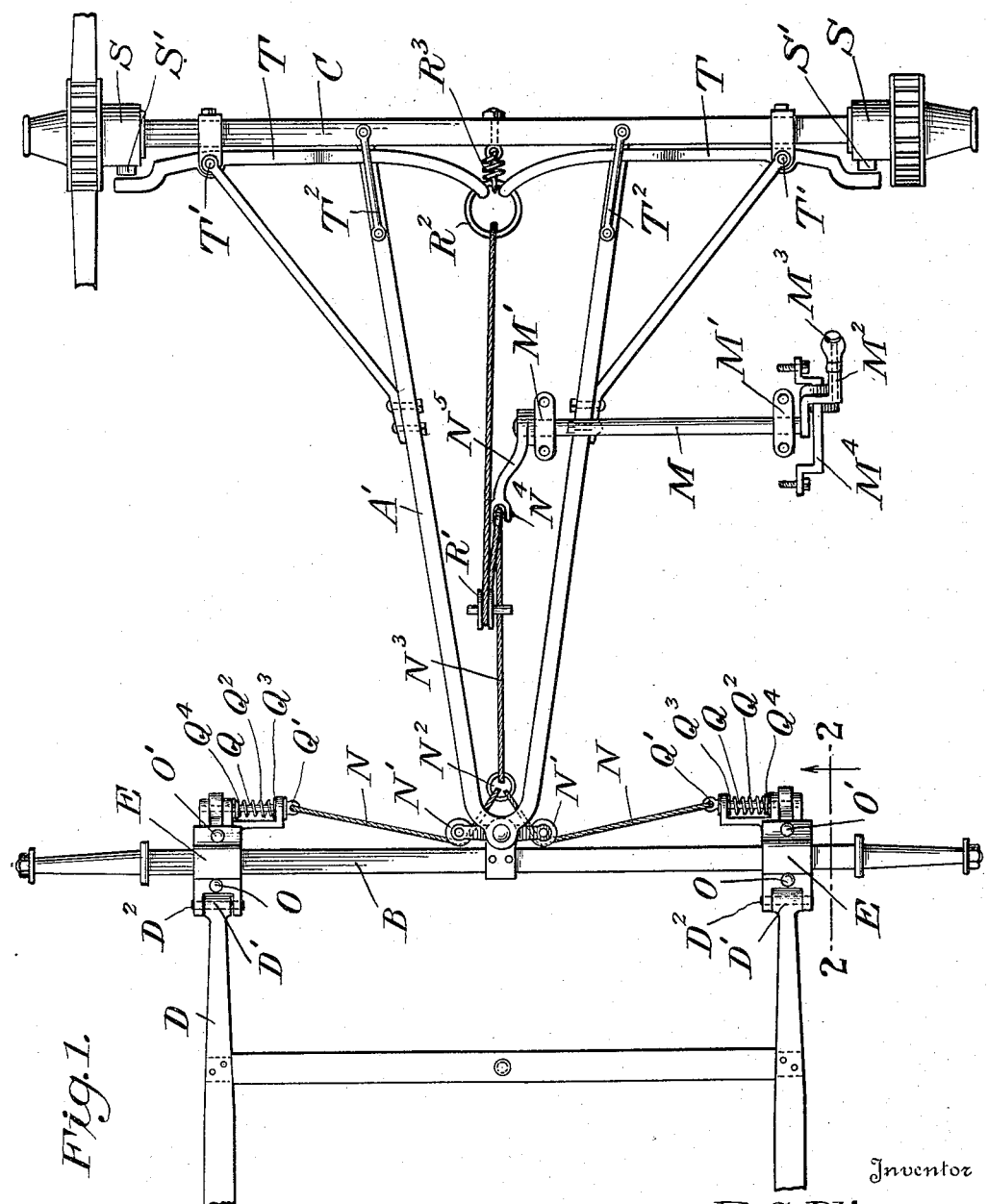

UNITED STATES PATENT OFFICE.

EDWARD C. BLISS, OF WAVERLY, OHIO.

SHAFT-RELEASING AND BRAKE-APPLYING DEVICE FOR VEHICLES.

1,156,661.      Specification of Letters Patent.      Patented Oct. 12, 1915.

Application filed March 23, 1915. Serial No. 16,396.

*To all whom it may concern:*

Be it known that I, EDWARD C. BLISS, a citizen of the United States, residing at Waverly, in the county of Pike and State of Ohio, have invented certain new and useful Improvements in Shaft-Releasing and Brake-Applying Devices for Vehicles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for detaching shafts from the running gear of vehicles and applying the brakes to the hubs of the wheels, and consists of a simple and efficient apparatus of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a top plan view showing the application of the invention. Fig. 2 is a cross sectional view on line 2—2 of Fig. 1, showing the releasing device secured to the axle. Fig. 3 is a similar view showing the device released. Fig. 4 is a detail view, and Fig. 5 is a view showing the lever mechanism for operating the brake and as applied to the side of a vehicle.

Reference now being had to the details of the drawings by letter, A designates the body of a vehicle, B the forward axle, C the rear axle, and D the thill, having an eye D' at its end for the reception of a bolt $D^2$ whereby the same is connected to the clamping members E and G, shown in detail in Figs. 2 and 3, the former of which fits over the forward axle B. The clamping member G has a lug projecting downwardly therefrom carrying a pin F upon which the clamping member H is pivotally mounted, which coöperates with the clamping member E to hold a pin in the recesses I and J formed respectively in the adjacent faces of the two members E and H.

A coiled spring L is mounted in a recess formed in the upper surface of the member H and engages over a screw O which, coöperating with a screw O', serves to hold the members E and G in place, said screws passing through apertures in a plate G passing underneath and engaging the axle. The plate G is provided with an aperture G' which is adapted to receive a pin Q when the two apertures G' and H' are in registration, in which position the spring L will be under tension. The pin Q has an eye Q' in one end to which a cable N is fastened, there being one secured to each pin as shown in Fig. 1, and the two cables pass about pulleys N' and are connected to a ring $N^2$. A coiled spring $Q^2$ is interposed between the washers $Q^3$ and $Q^4$ and serves to hold the pin at its farthest outer throw.

A cable $N^3$ is fastened to the ring $N^2$ and also to a pin $N^4$ carried by the crank arm $N^5$ which is fixed to the rock shaft M journaled in suitable bearings M' secured to the bottom of the body. $M^2$ is a lever secured to the shaft M and serves as a means for rocking the latter when the lever is released by the pushing in of the rod $M^3$ passing through the lever and which normally engages teeth upon the segment member $M^4$. A cable R is fastened to the pin $N^4$ and passes about a pulley R' secured to the under surface of the bottom of the body and is fastened to a ring $R^2$ which is connected by means of a coiled spring $R^3$ with the rear axle C. The hubs of the rear wheels are designated by letter S and upon the hub is a lug S'. Levers T are pivotally mounted upon pins T' and each lever is connected at its inner end to the ring $R^2$ and its other end, which is angled, is adapted, when the levers T are tilted, to be thrown into the paths of the lugs S', thus forming a brake to the rear wheels as the shaft is detached. Bars $T^2$ are fastened to the reach A' of the gear and serve to guide the levers T as they are swung upon their pivots.

The operation of my invention will be readily understood and is as follows: When it is desired to detach the shaft from the running gear to apply the brakes, the operator, by releasing the rod $M^3$, may swing the lever which, through the medium of the cables, will cause the spring-pressed pins to be withdrawn from the registering apertures H' in the two clamping members and the springs L will cause the clamping members to separate, thus releasing the pins $D^2$ and detaching the thills or shafts and, simultaneously with the releasing of the shafts, the brake levers are applied to the hubs of the rear wheels, thus tending to bring the running gear to a stop.

What I claim to be new is:—

An apparatus for detaching shafts from running gears of vehicles and applying brakes to the wheels thereof, comprising a clamping plate adapted to be fitted over an axle and provided with downwardly projecting lugs, said plate having a forwardly projecting portion with a recess in its under edge and a rearwardly and upwardly projecting portion which is apertured, a pivotal clamping member pivotally mounted underneath the portion which is adapted to engage the axle and having a grooved jaw, coöperating with the forwardly projecting portion of the plate, a spring interposed between the plates, said pivotal plate having one arm upwardly curved and apertured, a spring-pressed pin adapted to engage registering apertures in the rearwardly projecting portion of said plate, brakes, and connections between the same and said spring-actuated pin.

In testimony whereof I hereunto affix my signature in presence of two witnesses.

EDWARD C. BLISS.

Witnesses:
J. W. GREGG,
R. L. DAVIS.

Copies of this patent may be obtained for five cents each, by addressing the "Commissioner of Patents, Washington, D. C."